United States Patent
Liu

(10) Patent No.: US 10,762,818 B2
(45) Date of Patent: Sep. 1, 2020

(54) DISPLAY DEVICE AND DISPLAY METHOD THEREOF

(71) Applicant: BOE TECHNOLOGY GROUP CO., LTD., Beijing (CN)

(72) Inventor: Jiayao Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/167,247

(22) Filed: Oct. 22, 2018

(65) Prior Publication Data
US 2019/0311665 A1 Oct. 10, 2019

(30) Foreign Application Priority Data
Apr. 8, 2018 (CN) .......................... 2018 1 0306830

(51) Int. Cl.
*G09G 3/20* (2006.01)
*G06F 1/16* (2006.01)
(Continued)

(52) U.S. Cl.
CPC .............. *G09G 3/20* (2013.01); *G02B 3/0056* (2013.01); *G02B 30/00* (2020.01); *G06F 1/1637* (2013.01);
(Continued)

(58) Field of Classification Search
CPC .... G09G 3/20; G09G 2340/16; G02B 3/0056; G02B 27/22; G06F 1/1637; G02F 1/133526
(Continued)

(56) References Cited

U.S. PATENT DOCUMENTS

2004/0041784 A1   3/2004   Cho et al.
2008/0259233 A1*  10/2008  Krijn .................... H04N 13/302
                                                            349/15
(Continued)

FOREIGN PATENT DOCUMENTS

CN   101341763 A   1/2009
CN   101387756 A   3/2009
(Continued)

OTHER PUBLICATIONS

First Office Action issued in Chinese Patent Application No. 201810306830.5, dated Mar. 22, 2019; with English translation.

*Primary Examiner* — Chanh D Nguyen
*Assistant Examiner* — Ngan T. Pham-Lu
(74) *Attorney, Agent, or Firm* — McDemrott Will & Emery LLP

(57) ABSTRACT

A display device includes a display panel, a micro lens array, a driving system, a controller, and a signal processor. The controller is configured to set at least one preset path within one frame. The driving system is configured to drive, according to the preset path, the display panel and/or the micro lens array to move along respective preset path(s), and to control the display panel and/or the micro lens array that move along the preset path to stop moving at the stopping positions. The signal processor is configured to, in response to stopping of the display panel and/or the micro lens array at the corresponding stopping positions, provide display sub-images to the display panel according to the at least one preset path and one frame of display image.

15 Claims, 12 Drawing Sheets

(51) Int. Cl.
  *G02B 3/00*  (2006.01)
  *G02B 30/00*  (2020.01)
  *G02F 1/1335*  (2006.01)

(52) U.S. Cl.
  CPC ... *G02F 1/133526* (2013.01); *G09G 2340/16* (2013.01)

(58) Field of Classification Search
  USPC .......................................................... 345/55
  See application file for complete search history.

(56) References Cited

U.S. PATENT DOCUMENTS

| | | | |
|---|---|---|---|
| 2009/0052027 A1* | 2/2009 | Yamada | G02B 27/2214 359/463 |
| 2011/0096071 A1 | 4/2011 | Okamoto et al. | |
| 2016/0358522 A1* | 12/2016 | Du | G02B 3/005 |
| 2016/0363840 A1 | 12/2016 | Mizoguchi et al. | |

FOREIGN PATENT DOCUMENTS

| | | | |
|---|---|---|---|
| CN | 102053378 A | 5/2011 | |
| CN | 102289113 A | 12/2011 | |
| CN | 103278973 A | 9/2013 | |
| CN | 106249401 A | 12/2016 | |
| CN | 106297610 A | 1/2017 | |

\* cited by examiner

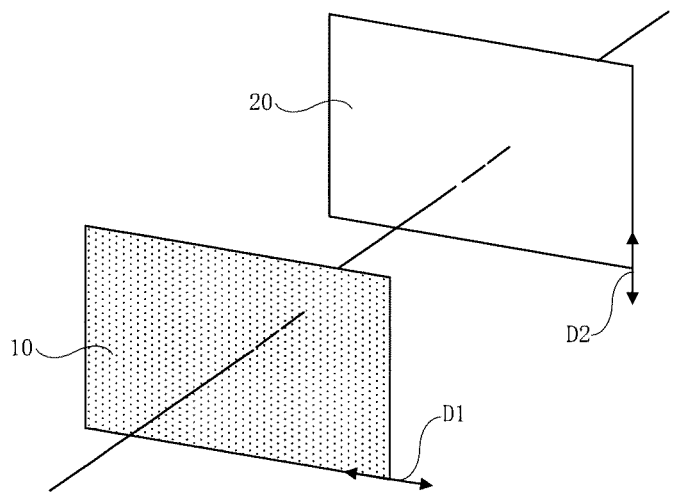

Fig. 9

| The driving system drives the display panel to move along a corresponding preset path of the at least one preset path according to the corresponding preset path so that relative displacements exist between all the pixels of the display panel and the micro lenses that correspond to the respective pixels, all the pixels of the display panel are horizontally moved to the second stopping position along the corresponding preset path, and in the horizontal direction, a superposed pixel that is located at the second stopping position is formed between any two adjacent pixels. | ─S1021 |

↓

| The driving system drives the display panel according to the corresponding preset path so that relative displacements exist between all pixels of the display panel and the micro lenses that correspond to the respective pixels, all pixels of the display panel are vertically moved to the third stopping position along the corresponding preset path, and in the vertical direction, a superposed pixel that is located at the third stopping position and is adjacent to the superposed pixel of the second stopping position is formed. | ─S1022 |

↓

| The driving system drives the display panel to move according to the corresponding preset path so that relative displacements between all pixels of the display panel and the micro lenses that correspond to the respective pixels occur, all pixels of the display panel are horizontally moved to the third stopping position along the corresponding preset path, and in the vertical direction, the superposed pixels that are located at the fourth stopping position and are adjacent to the superposed pixels located at the first stopping position are formed. | ─S1023 |

Fig. 10

DISPLAY DEVICE AND DISPLAY METHOD THEREOF

CROSS-REFERENCE TO RELATED APPLICATION

This application claims priority to Chinese Patent Application No. 201810306830.5, filed on Apr. 8, 2018, titled "A DISPLAY DEVICE AND DISPLAY METHOD THEREOF", which is incorporated herein by reference in its entirety.

TECHNICAL FIELD

The present disclosure relates to the field of display technologies, and in particular, to a display device and a display method thereof.

BACKGROUND

With the continuous development of display technologies, 3D (Dimension) display technologies are increasingly popularized and used. Compared to the 2D display image, the 3D display image needs to display more information.

SUMMARY

In an aspect, a display device is provided. The display device includes a display panel, a micro lens array, a controller, a driving system and a signal processor. The micro lens array is disposed on a display side of the display panel, and includes a plurality of micro lenses arranged in an array. The controller is configured to set at least one preset path within one frame, and each preset path has at least two stopping positions thereon. The driving system is connected to the controller, and the display panel and/or the micro lens array. The driving system is configured to drive, according to the at least one preset path, the display panel and/or the micro lens array to move along respective preset path(s). The driving system is further configured to control the display panel and/or the micro lens array that move along the respective preset path(s) to stop moving and maintain a stopping state within a preset time duration at corresponding stopping positions. The signal processor is connected to the controller and the display panel, and is configured to, in response to stopping of the display panel and/or the micro lens array at the corresponding stopping positions, provide display sub-images to the display panel according to the at least one preset path and one frame of display image. Within one frame, display sub-images that correspond to the at least two stopping positions in one of the at least one preset path are overlaid as the frame of display image.

In some embodiments, the display further includes a front frame. The driving system includes at least one vibration platform. The display panel is fixedly mounted in the front frame, the micro lens array is mounted on the vibration platform, and the vibration platform is configured to drive the micro lens array to move. Alternatively, the micro lens array is fixedly mounted in the front frame, the display panel is mounted on the vibration platform, and the vibration platform is configured to drive the display panel to move.

In some embodiments, the driving system includes a first vibration platform and a second vibration platform. The display panel is mounted on the first vibration platform, and the first vibration platform is configured to drive the display panel to move. The micro lens array is mounted on the second vibration platform, and the second vibration platform is configured to drive the micro lens array to move.

In some embodiments, the driving system is a micro-electro-mechanical system.

In another aspect, a display method of the display device is provided. The method includes: setting, by the controller, at least one preset path within one frame, each preset path having at least two stopping positions thereon; within one frame, driving, by the driving system, the display panel and/or the micro lens array to move along respective preset path(s) according to the at least one preset path, so that all pixels of the display panel are displaced with respect to micro lenses that correspond to respective pixels, and controlling, by the driving system, the display panel and/or the micro lens array to stop displacing and maintain a stopping state within a preset time duration at corresponding stopping positions, wherein the display panel does not display during that all pixels of the display panel are relatively displaced with respect to the micro lenses that correspond to the respective pixels; at the at least two stopping positions, providing, by the signal processor, display sub-images to the display panel according to the at least one preset path and one frame of display image, the pixels in the display panel emitting light according to display image sub-signals; and converging, by each micro lens, light emitted by pixels that correspond to the micro lens so that images are formed on a side of the micro lens away from the display panel.

In some embodiments, a plane where each of the at least one preset path set by the controller is located is parallel to a light exit surface of the display panel or a light exit side surface of the micro lens array.

In some embodiments, one of the at least one preset path includes four stopping positions, and a starting point of the one of the at least one preset path is a first stopping position. In the display panel, a spacing between any two adjacent pixels is greater than or equal to a width of a pixel. Driving, by the driving system, the display panel and/or the micro lens array to move along respective preset path(s) according to the at least one preset path, so that all pixels of the display panel are displaced with respect to micro lenses that correspond to respective pixels, and controlling, by the driving system, the display panel and/or the micro lens array to stop displacing at corresponding stopping positions, includes: driving, by the driving system, the display panel to move according to the one of the at least one preset path, so that relative displacements exist between all pixels of the display panel and the micro lenses that correspond to the respective pixels, all pixels of the display panel are horizontally moved to a second stopping position along the one of the at least one preset path, and in a horizontal direction, a superposed pixel that is located at the second stopping position is formed between any two adjacent pixels; driving, by the driving system, the display panel to move according to the one of the at least one preset path, so that relative displacements exist between all pixels of the display panel and the micro lenses that correspond to the respective pixels, all pixels of the display panel are vertically moved to a third stopping position along the one of the at least one preset path, and in a vertical direction, a superposed pixel that is located at the third stopping position and is adjacent to the superposed pixel located at the second stopping position is formed; and driving, by the driving system, the display panel to move according to the one of the at least one preset path, so that relative displacements exist between all pixels of the display panel and the micro lenses that correspond to the respective pixels, all pixels of the display panel are horizontally moved to a fourth stopping position along the one of the at least one preset path, and in the vertical direction, a superposed pixel that is located at the fourth stopping position and is adjacent to a pixel located at the first stopping position are formed.

In some embodiments, at the at least two stopping positions, providing, by the signal processor, display sub-images to the display panel according to the at least one preset path and one frame of display image, includes: sequentially dividing, by the signal processor, one frame of display image into four display sub-images according to an order of the four stopping positions on the one of the at least one preset path, and each display sub-image corresponds to one stopping position.

In some embodiments, one of the preset path includes at least two stopping positions, and a starting point of the one of the at least one preset path is a first stopping position. In the display panel, a spacing between any two adjacent pixels is less than a half of a width of a pixel. Driving, by the driving system, the display panel and/or the micro lens array to move along respective preset path(s) according to the at least one preset path, so that all pixels of the display panel are displaced with respect to micro lenses that correspond to respective pixels, and controlling, by the driving system, the display panel and/or the micro lens array to stop displacing at corresponding stopping positions, includes: driving, by the driving system, the display panel to move according to the one of the at least one preset path, so that relative displacements exist between all pixels of the display panel and the micro lenses that correspond to the respective pixels, and all pixels of the display panel are horizontally moved to a second stopping position along the one of the at least one preset path. For each pixel, an orthographic projection of the pixel when it is located at the second stopping position on a plane where the pixel is located has an overlapping region with an orthographic projection of the pixel when it is located at the first stopping position on the plane, and has an overlapping region with an orthographic projection of another pixel adjacent to the pixel on the plane when the another pixel is located at the first stopping position, and superposed pixels are respectively formed at the overlapping regions.

In some embodiments, at the at least two stopping positions, providing, by the signal processor, display sub-images to the display panel according to the at least one preset path and one frame of display image, includes: sequentially dividing, by the signal processor, the one frame of display image into at least two display sub-images according to the at least two stopping positions, and each display sub-images corresponding to one stopping position; and superposing, by the signal processor, a display sub-image received by the superposed pixels with a display sub-image received by the pixels each of which is in a same overlapping region as a corresponding one of the superposed pixels.

In some embodiments, a starting point and an end point of each preset path overlap.

In some embodiments, any two stopping positions on each preset path except a starting point and an end point are different.

In some embodiments, a distance between a stopping position and an adjacent stopping position on a same preset path of the at least one preset path has a same value as a distance between the stopping position and another adjacent stopping position one the same preset path.

In yet another aspect, a computer device is provided. The computer device includes a memory and a processor. The memory includes executable instructions stored thereon. The processor is configured to execute the executable instructions to implement the display method of the display device described above.

In yet another aspect, a non-transitory computer-readable storage medium is provided, and the storage medium stores executable instructions that, when executed by a display device, cause the display device to implement the display method of the display device described above.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

FIG. 4c is a schematic diagram showing images of the intrinsic pixels and the superposed pixels shown in FIG. 4a;

FIG. 9 is a schematic diagram showing preset paths when a display panel and a micro lens array are relatively displaced according to some embodiments of the present disclosure;

FIG. 10 is a flow diagram of an implementation manner of S102 according to some embodiments of the present disclosure;

DETAILED DESCRIPTION

Technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1A:
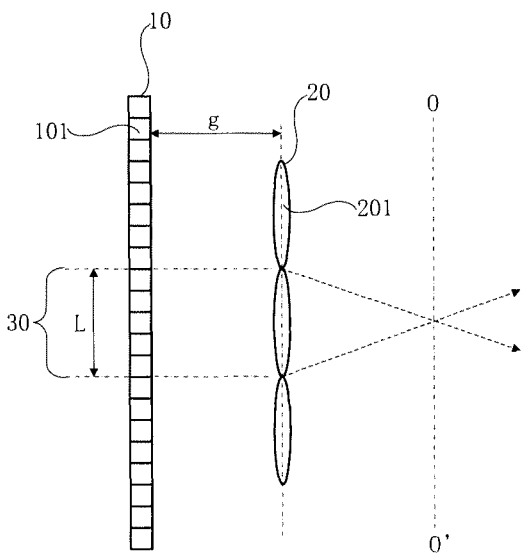
FIG. 1a is a schematic diagram showing how a display device realizes display according to some embodiments of the present disclosure.

Some embodiments of the present disclosure provide a display method of a display device. The display device, as shown in FIG. 1a, includes a display panel 10 and a micro lens array 20 disposed on a display side of the display panel 10. The micro lens array 20 includes a plurality of micro lenses 201 arranged in an array. The display panel 10 includes a plurality of pixels 101 arranged in an array.

Each micro lens 201 is configured to converge light emitted by pixels 101 that correspond to the micro lens 201. The micro lens 201 is for example a lens formed of a transparent resin material or other optical device such as a liquid crystal lens, which is not limited in the present disclosure.

As shown in FIG. 1a, a display area of the display panel 10 is, for example, divided into a plurality of sub-image units 30 arranged in an array. Each sub-image unit 30 includes multiple pixels of the plurality of pixels 101. That is, the plurality of pixels 101 of the display panel 10 is divided into a plurality of groups, and each group includes multiple pixels of the plurality of pixels 101. When a 3D image is to be displayed, the 3D image is divided into a plurality of sub-images, and each sub-image is loaded into a corresponding sub-image unit 30 in the display panel 10. In this case, the plurality of sub-image units 30 are integrated to load and display three-dimensional information in the 3D image. In some embodiments, each sub-image unit 30 corresponds to one micro lens 201. A length L of the sub-image unit 30 is the same as or approximately the same as a longitudinal length of the micro lens 201 that corresponds to the sub-image unit 30.

In some embodiments, a distance g between the display panel 10 and an optical center of a micro lens 201 in the micro lens array 20 is the same as or approximately the same as a focal length of the micro lens 201. In this case, light emitted from each pixel 101 is imaged on a central depth plane O-O' after passing through the micro lens 201 that corresponds to the pixel 101, and the images of all the pixels 101 on the central depth plane O-O' are integrated to form a 3D image. Based on this, the display device is for example a device that realizes glasses-free 3D display using the integrated imaging principle.

Figure 1B:
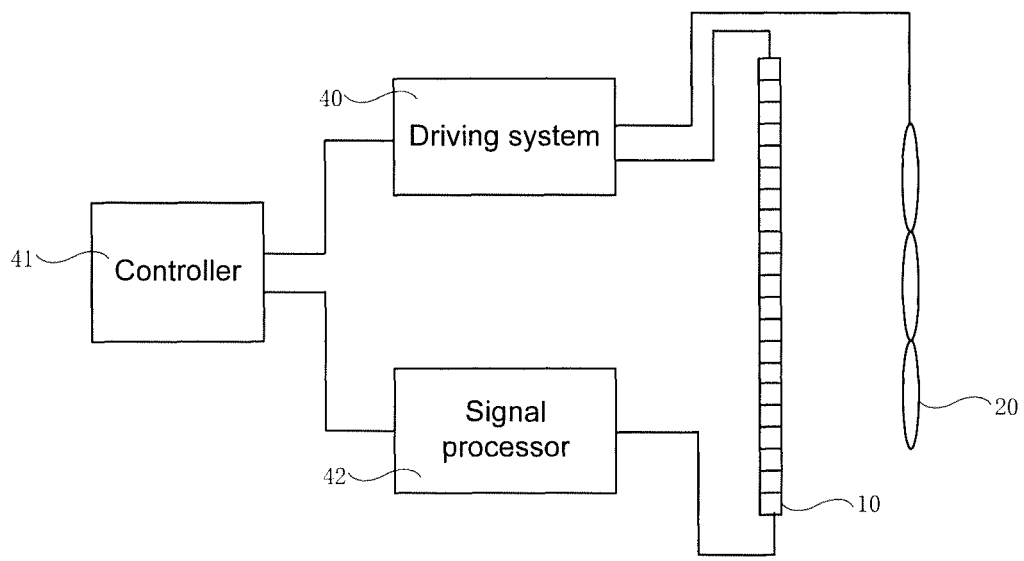
FIG. 1b is a schematic structural diagram of a display device according to some embodiments of the present disclosure.

In addition, as shown in FIG. 1b, the display device further includes a driving system 40, a controller 41, and a signal processor 42.

The controller 41 is configured to set at least one preset path within one frame. Each preset path has at least two stopping positions thereon.

The driving system 40 is connected to the controller 41, and the display panel 10 and/or the micro lens array 20. The driving system 40 is configured to drive, according to the at least one preset path, the display panel 10 and/or the micro lens array 20 to move along respective preset path(s), and is configured to control the display panel 10 and/or the micro lens array 20 that move along the respective preset path(s) to stop moving and maintain a stopping state within a preset time duration at corresponding stopping positions.

It can be understood that in a case where the driving system 40 is connected to the display panel 10 rather than the micro lens array 20, the driving system 40 drives the display panel 10 to move along a preset path. In a case where the driving system 40 is not connected to the display panel 10 but is connected to the micro lens array 20, the driving system 40 drives the micro lens array 20 to move along a preset path. In a case where the driving system 40 is connected to both the display panel 10 and the micro lens array 20, the driving system 40 drives the display panel 10 to move along a preset path, or drives the micro lens array 20 to move along a preset path, or, drives the display panel 10 and the micro lens array 20 to move along respective preset paths. In FIG. 1b, the driving system 40 is connected to both the display panel 10 and the micro lens array 20.

The signal processor 42 is connected to the controller 41 and the display panel 10. The signal processor 42 is configured to, in response to stopping of the display panel 10 and/or the micro lens array 20 at the corresponding stopping positions, provide display sub-images to the display panel 10 according to one frame of display image and the at least one preset path. Within one frame, the display sub-images that correspond to stopping positions in one of the at least one preset path are overlaid as the frame of display image.

Figure 2:
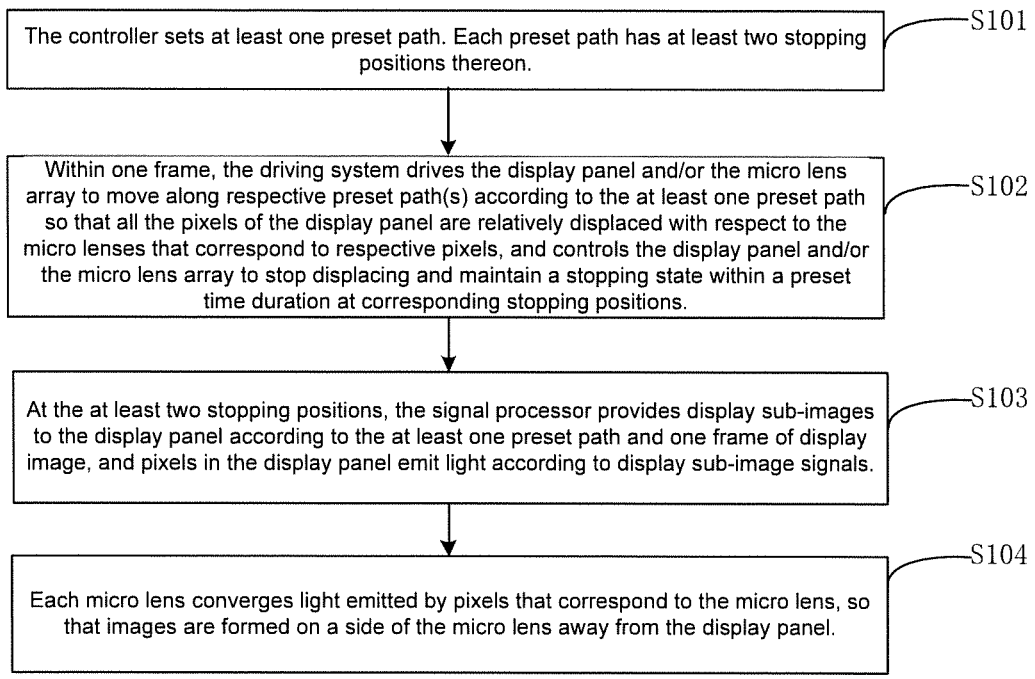
FIG. 2 is a flow diagram of a display method of a display device according to some embodiments of the present disclosure.

Based on this, as shown in FIG. 2, the display method includes steps 101-104 (S101-S104).

In S101, the controller 41 sets at least one preset path. Each preset path has at least two stopping positions thereon.

In S102, within one frame, the driving system 40 drives the display panel 10 and/or the micro lens array 20 to move along respective preset path(s) according to the at least one preset path so that all the pixels 101 of the display panel 10 are relatively displaced with respect to the micro lenses 201 that correspond to respective pixels 101, and controls the display panel 10 and/or the micro lens array 20 to stop displacing and maintain a stopping state within a preset time duration at corresponding stopping positions.

It will be noted that the display panel 10 does not display an image during the relative displacement with respect to the micro lens array 20, and the display panel 10 displays the display sub-image when the display panel 10 or the micro lens array 20 is at the above described stopping positions.

In S103, at the at least two stopping positions, the signal processor 42 provides display sub-images to the display panel 10 according to the at least one preset path and one frame of display image, and pixels 101 in the display panel 10 emit light according to display sub-image signals.

It will be noted that the setting of the above described preset time duration needs to meet the requirement that the displacement and the stopping actions of the pixels cannot be recognized by human eyes within one frame.

In S104, each micro lens 201 converges light emitted by pixels 101 that correspond to the micro lens 201, so that images are formed on a side of the micro lens 201 away from the display panel 10.

As shown in FIG. 1a, the light emitted by pixels 101 of each sub-image unit 30 in the display panel 10 will be converged to an intersection point after refracted by the micro lens 201 that correspond to the pixels 101. The plane in which a plurality of intersection points are located is the central depth plane O-O'.

Figure 3A:
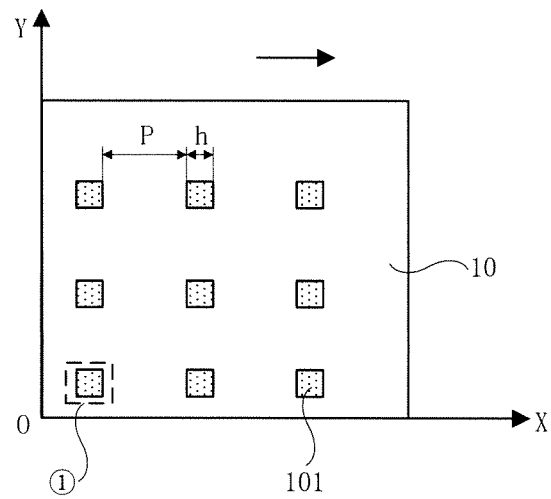
FIGS. 3a, 3b, 3d, and 3e are schematic diagrams respectively showing superposed pixels formed at stopping positions.
Figure 3B:
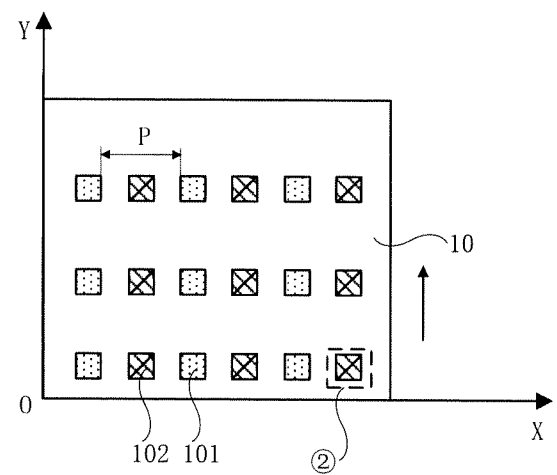

As shown in FIG. 3a, in some embodiments, a spacing P between two adjacent pixels of the plurality of pixels 101 for defining the intrinsic resolution of the display panel 10 is sufficiently large. For example, the spacing P is the same as or approximately the same as a width h of one pixel 101, or larger than the width h of the pixel 101. Based on this, when the above described S102 is performed, after display panel 10 is moved to the right, for example, along an arrow shown in FIG. 3a, the movement is stopped at one stopping position (for example, the stopping position 2 shown in FIG. 3b), and the stopping state is maintained at the stopping position within a preset time duration. In this case, as shown in FIG. 3b, a superposed pixel 102 is formed between two adjacent pixels 101.

Figure 3C:
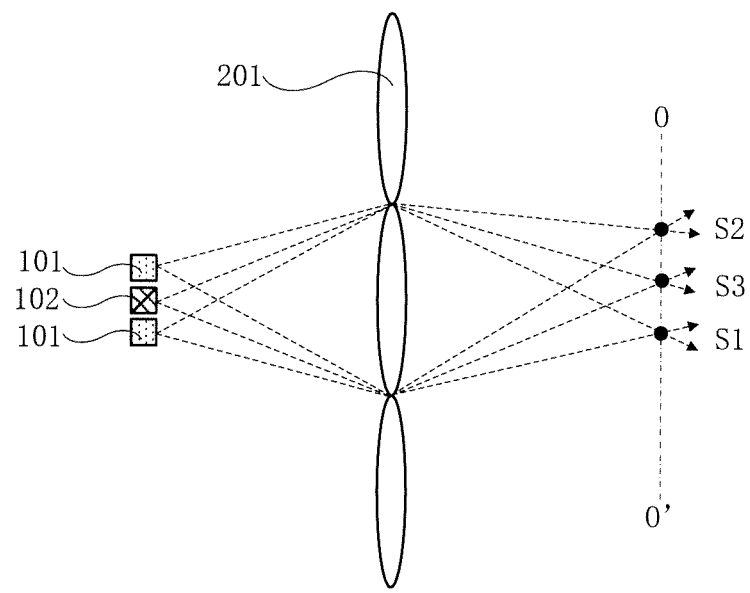
FIG. 3c is a schematic diagram showing images of the intrinsic pixels and the superposed pixel shown in FIG. 3b.

At this time, as shown in FIG. 3c, light emitted from the superposed pixel 102 formed between two adjacent pixels 101 at the stopping position passes through the micro lens 201 that corresponds to the superposed pixel 102 and is imaged on the central depth plane O-O' to form an image S3. The image S3 is located between the image S1 and the image S2 that are formed by the two intrinsic pixels 101 that is adjacent to the superposed pixel 102.

In some embodiments, the spacing P between two adjacent pixels of the plurality of pixels 101 for defining the intrinsic resolution of the display panel 10 is relative small. For example, the spacing P is less than half of the width of one pixel 101. Based on this, after the above described S102 is performed, as shown in FIGS. 4a and 4b, orthographic projections of the same pixel 101 on a plane where the pixel is located when it is located at any two different stopping positions in the same preset path have an overlapping region.

Figure 4A:
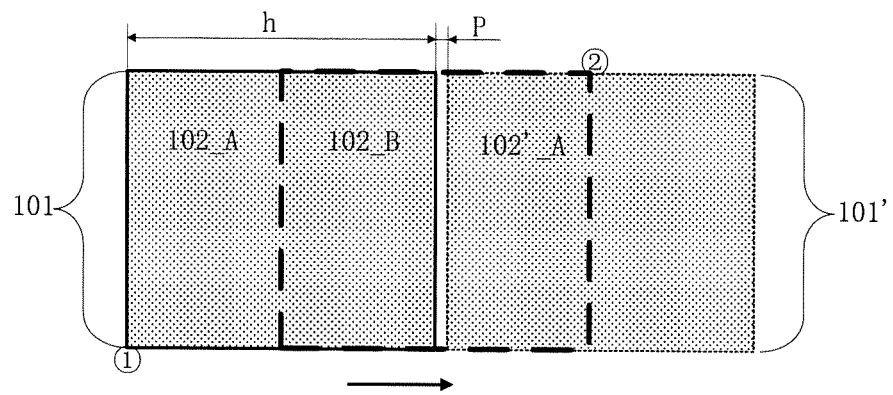
FIG. 4a is a schematic diagram showing superposed pixels according to some embodiments of the present disclosure.
Figure 4B:
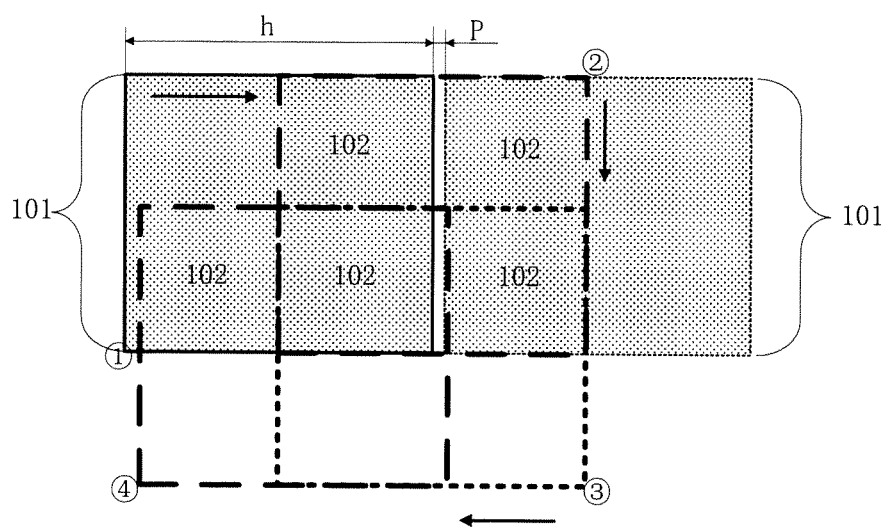
FIG. 4b is a schematic diagram of some other superposed pixels according to some embodiments of the present disclosure.

As shown in FIG. 4a, the arrow indicates the direction of displacement of the intrinsic pixel 101 in the display panel 10 along a preset path. In this case, the original position of the pixel 101 can be set to the stopping position 1, and then the display panel 10 is moved so that a relative displacement exists between the display panel 10 and the micro lens array 20. The pixel 101 is displaced to the right along the direction of the arrow, and is stopped from displacing at the stopping position 2. The stopping state is maintained within a preset time duration at the stopping position 2. In this case, as shown in FIG. 4a, for any pixel 101, an orthographic projection of the pixel 101, when the pixel is located at the stopping position 2, on a plane where the pixel is located has an overlapping region with an orthographic projection of the pixel 101 on the plane when it is located at the stopping position 1, thereby the pixel 101 is divided into a pixel 102_A and a superposed pixel 102_B. Furthermore, the orthographic projection of the pixel 101 on the plane when the pixel is located at the stopping position 2 also has an overlapping region with an orthographic projection of another pixel 101' located on the right side of the pixel 101 on the plane when the pixel 101' is located at the stopping position 1, thereby forming a superposed pixel 102'_A in the overlapping region. It will be noted that since the orthographic projection of the pixel 101 on the plane when the pixel 101 is located at the stopping position 1 has an overlapping region with an orthographic projection of yet another pixel 101 located on the left side of the pixel 101 on the plane when the yet another pixel 101 is located at the stopping position 2, and this overlapping region is just the region where the pixel 102_A is located, the pixel 102_A is actually also a superposed pixel 102_A.

Figure 4C:
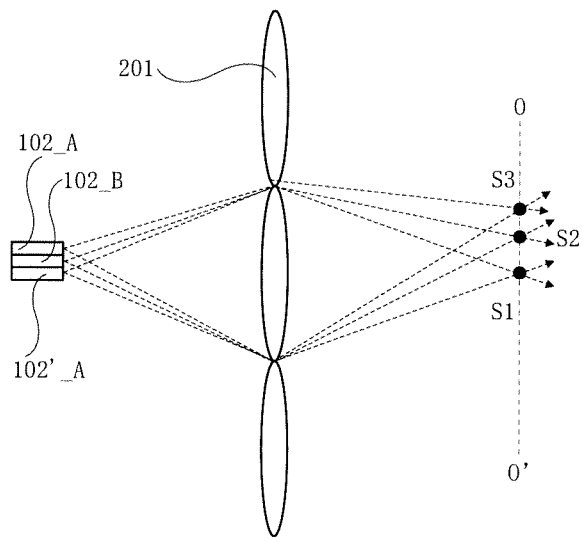

In this case, as shown in FIG. 4c, light emitted from the superposed pixels that are formed at each of the stopping positions, such as the above described superposed pixel 102_A, the superposed pixel 102_B and the superposed pixel 102'_A, respectively form an image S1 (the image of the superposed pixel 102_A), an image S2 (the image of the superposed pixel 102_6), and an image S3 (the image of the superposed pixel 102'_A) on the central depth plane O-O' after passing through the micro lens 201 that corresponds to the superposed pixels.

It can be seen from the above description that in the display method provided in the embodiments of the present disclosure, at least one preset path may be set by the controller 41 within one frame, and each preset path has at least two stopping positions. Then, the driving system 40 drives the display panel 10 and/or the micro lens array 20 to move along respective preset path(s) according to the at least one preset path, so that relative displacements exist between all the pixels 101 of the display panel 10 and the micro lenses 201 that correspond to the respective pixels 101, and at each stopping position on the preset path, all the pixels 101 and/or the micro lenses 201 maintain a stopping state within a preset time duration. In this case, after all the pixels 101 are relatively displaced with respect to the micro lenses 201 that correspond to the pixels 101, the superposed pixel 102 can be formed between any two adjacent pixels of the pixels 101 for defining the intrinsic resolution of the display panel 10. Alternatively, it is possible that orthographic projections of the same pixel 101, when it is located at different stopping positions in the same preset path, on the plane have an overlapping region, so that a plurality of superposed pixels 102 can be obtained from one intrinsic pixel 101. On this basis, the signal processor 42 provides display sub-images to the display panel 10 at the stopping positions according to the at least one preset path and one frame of display image, so that images of the superposed pixels 102 formed at each of stopping positions are formed on the central depth plane O-O' after light emitted from the superposed pixels 102 passing through the micro lenses 201 that correspond to the superposed pixels 102. In this way, within one frame, an image to be displayed by one intrinsic pixel 101 can be formed by superposing the images displayed by a plurality of superposed pixels 102 that are obtained from the intrinsic pixel 101 within the time range in which the overlapping cannot be recognized by human eyes, so that one intrinsic pixel 101 displays more contents, thereby improving the resolution.

The manner in which the display panel 10 and/or the micro lens array 20 are relatively displaced along the at least one preset path is exemplified in detail below.

In this manner, a parallel relative displacement occurs between the display panel 10 and the micro lens array 20. In this case, a plane where each of the at least one preset path set by the controller 41 is located is parallel to a light exit surface of the display panel 10 or a light exit side surface of the micro lens array 20.

Figure 5:
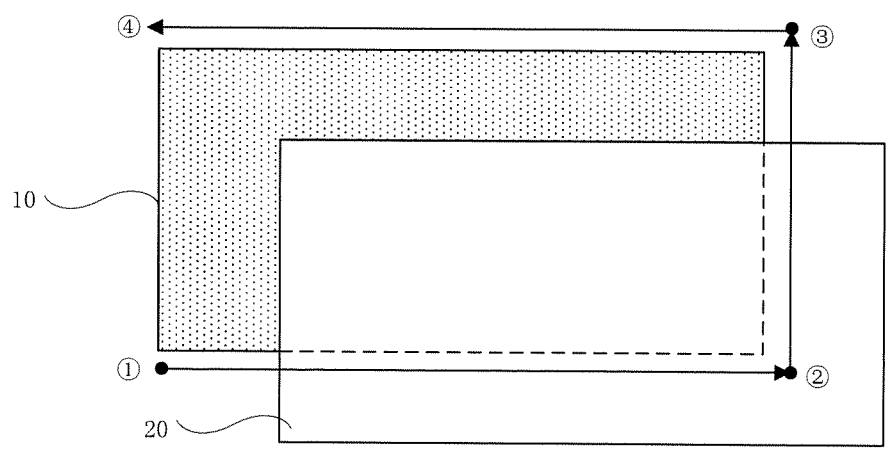
FIG. 5 is a schematic diagram showing a preset path parallel to a light exit surface of a display panel according to some embodiments of the present disclosure.

FIG. 5 shows a case where the micro lens array 20 is fixed and the display panel 10 is moved along a preset path. In FIG. 5, the preset path (shown by the arrow line) is provided with four stopping positions (1, 2, 3, and 4) thereon. The first stopping position 1 is the initial position of the display panel 10. As shown in FIG. 3a, the display panel 10 has a plurality of pixels 101 arranged in a matrix at the stopping position 1. The plurality of pixels 101 determine the intrinsic resolution of the display panel 10. A spacing P between any two adjacent intrinsic pixels 101 is greater than a width h of one pixel 101, or the same as or approximately the same as the width h of the pixel 101. It will be noted that the case where the spacing P between any two adjacent intrinsic pixels 101 is approximately the same as the width h of one pixel 101, includes the case where the spacing P is slightly smaller than the width h of the pixel 101. The area of the overlapping region of the superposed pixel 102 that is formed between the two adjacent pixels 101 and the pixels 101 on both sides of the superposed pixel 101 are small; therefore, the display contents in the overlapping region are negligible.

Figure 6A:
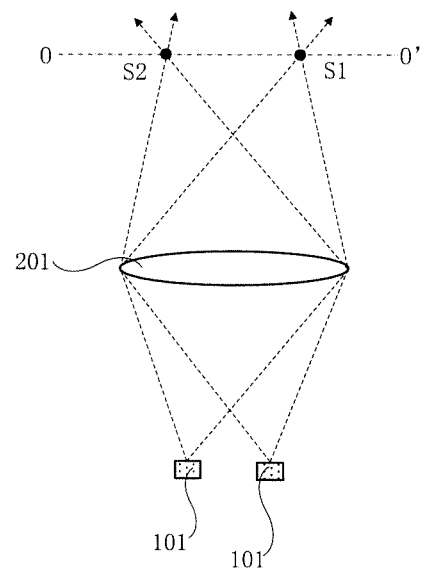
FIG. 6a is a schematic diagram showing images of a display panel located at the stopping position 1 in FIG. 5.

In this case, light emitted from each pixel 101 can be imaged on the central depth plane O-O' after passing through the micro lens 201 that corresponds to the pixel 101. For example, as shown in FIG. 6a, an image S1 (the image of the left pixel 101) and an image S2 (the image of the right pixel 101) are formed on the above described central depth plane O-O' after light emitted from the two adjacent intrinsic pixels 101 passes through their corresponding micro lens 201.

On this basis, the above described S102 in which the driving system 40 drives the display panel 10 and/or the micro lens array 20 to move along respective preset path(s) according to the at least one preset path so that relative displacements exist between all the pixels 101 of the display panel 10 and the micro lenses 201 that correspond to the respective pixels 101, and controls the display panel 10 and/or the micro lens array 20 to stop displacing at corresponding stopping positions, as shown in FIG. 10, includes steps 1021 and 1022 (S1021 and S1022).

In S1021, the driving system 40 drives the display panel 10 to move along a corresponding preset path of the at least one preset path according to the corresponding preset path so that relative displacements exist between all the pixels 101 of the display panel 10 and the micro lenses 201 that correspond to the respective pixels 101, all the pixels 101 of the display panel 10 are horizontally moved to the second stopping position along the corresponding preset path, and in the horizontal direction, a superposed pixel 102 that is located at the second stopping position is formed between any two adjacent pixels 101.

That is, the driving system 40 drives the display panel 10 to move according to the corresponding preset path, so that horizontal relative displacements exist between all the pixels 101 of the display panel 10 and the micro lenses 201 that correspond to the respective pixels 101. The intrinsic pixels 101 in the display panel 10 are horizontally moved to the right within the plane XOY, for example, along the direction of the arrow in FIG. 3a. The plane XOY is parallel to the light exit surface of the display panel 10 or the light exit side surface of the micro lens array 20. In this case, as shown in FIG. 3b, all the pixels 101 of the display panel 10 are horizontally moved to the second stopping position 2 along the corresponding preset path, and in the horizontal direction within the plane XOY, a superposed pixel 102 is formed between two adjacent pixels 101 of the pixels for determining the intrinsic resolution of the display panel 10 at the second stopping position 2.

It will be noted that since when a horizontal relative displacement occurs between the display panel 10 and the micro lens array 20, the plane where the preset path is located (the plane XOY) is parallel to the light exit surface of the display panel 10 or the light exit side surface of the micro lens array 20, after the display panel 10 is horizontally moved along a preset path within a plane (the plane XOY) where the preset path is located, i.e., moved along the X-axis direction, the formed superposed pixel 102 can be in the same row as the intrinsic pixel 101.

Similarly, after the display panel 10 are vertically moved along a preset path within a plane (the plane XOY) where the preset path is located, i.e., moved along the Y-axis direction, the formed superposed pixel 102 can be in the same column as the intrinsic pixel 101.

Figure 6B:
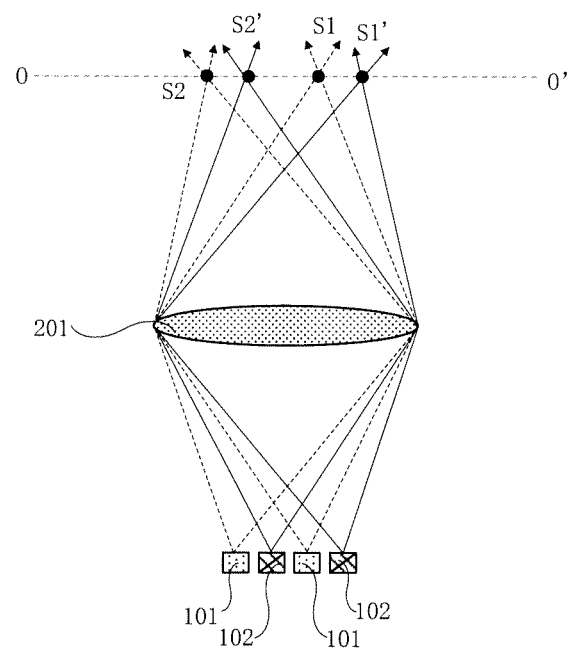
FIG. 6b is a schematic diagram showing images of a display panel located at the stopping position 2 in FIG. 5.

As shown in FIG. 6b, two of superposed pixels are taken as an example, and an image S1' (the image of the left superposed pixel 102) and an image S2' (the image of the right superposed pixel 102) are formed on the central depth plane O-O' after light emitted from the two formed superposed pixels 102 passes through the micro lens 201 that corresponds to the superposed pixels 102. In this way, increasing the superposed pixel 102 on the right side of the intrinsic pixel 101 may double the number of images of the display panel 10 on the central depth plane O-O' within one frame, thereby doubling the resolution of one frame of image.

In S1022, the driving system 40 drives the display panel 10 according to the corresponding preset path so that relative displacements exist between all pixels 101 of the display panel 10 and the micro lenses 201 that correspond to the respective pixels 101, all pixels 101 of the display panel 10 are vertically moved to the third stopping position along the corresponding preset path, and in the vertical direction, a superposed pixel 102 that is located at the third stopping position and is adjacent to the superposed pixel 102 of the second stopping position is formed.

Figure 3D:
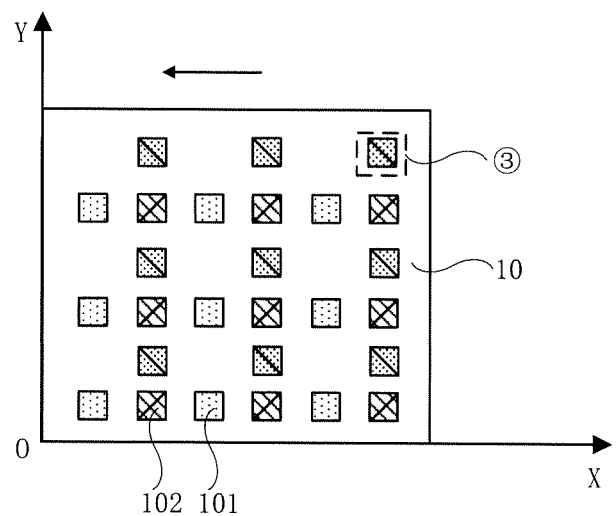

That is, on the basis that all pixels 101 of the display panel 10 are horizontally moved to the second stopping position 2 along the corresponding preset path, the driving system 40 continues to drive the display panel 10 so that vertical relative displacements of all pixels 101 of the display panel 10 with respect to the micro lenses 201 that correspond to the respective pixels 101 occur. For example, within the plane XOY, the intrinsic pixels 101 in the display panel 10 are vertically moved upward along the direction of the arrow in FIG. 3b. In this case, as shown in FIG. 3d, all pixels 101 of the display panel 10 are vertically moved to a third stopping position 3 along the corresponding preset path, and in the vertical direction within the plane XOY, the superposed pixels 102 that are located at the third stopping position 3 and are adjacent to the superposed pixels 102 located at the second stopping position 2 are formed (that is, the superposed pixels 102 located at the upper right corner of the intrinsic pixels 101). Based on this, three images can be respectively formed on the central depth plane O-O' after light emitted from an intrinsic pixel 101, a superposed pixel 102 located at the right of the pixel 101 and a superposed pixel 102 located at the upper right corner of the pixel 101 passes through the micro lens 201 that corresponds to the intrinsic pixel 101 and each of superposed pixels 102. Thus, the number of images of the display panel 10 on the central depth plane O-O' within one frame is further increased to achieve the purpose of further improving the resolution.

In S1023, the driving system 40 drives the display panel 10 to move according to the corresponding preset path so that relative displacements between all pixels 101 of the display panel 10 and the micro lenses 201 that correspond to the respective pixels 101 occur, all pixels of the display panel 10 are horizontally moved to the third stopping position along the corresponding preset path, and in the vertical direction, the superposed pixels 102 that are located at the fourth stopping position and are adjacent to the superposed pixels 101 located at the first stopping position are formed.

Figure 3E:
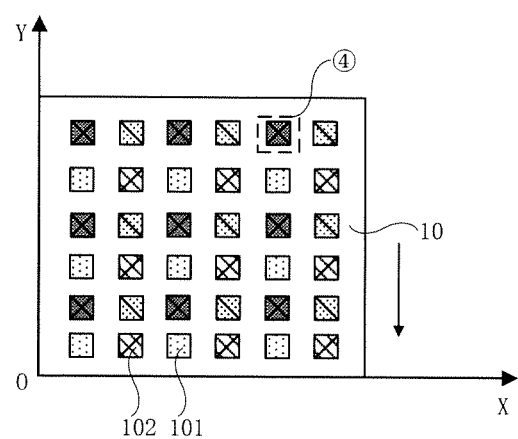

That is, on the basis that all pixels 101 of the display panel 10 are vertically moved to the third stopping position 3 along the corresponding preset path, the driving system 40 continues to drive the display panel 10 so that horizontal relative displacements of all pixels 101 of the display panel 10 with respect to the micro lenses 201 that correspond to the respective pixels 101 occur. For example, within the plane XOY, the intrinsic pixels 101 in the display panel 10 are moved to the left along the direction of the arrow in FIG. 3d. In this case, as shown in FIG. 3e, all pixels 101 of the display panel 10 are horizontally moved to a fourth stopping position 4 along the corresponding preset path, and in the vertical direction within the plane XOY, the superposed pixels 102 that are located at the fourth stopping position 4 and are adjacent to the superposed pixels 101 located at the first stopping position 1 are formed (that is, the superposed pixels 102 located at the upward side of the intrinsic pixels 101). Based on this, fourth images can be respectively formed on the central depth plane O-O' after light emitted from an intrinsic pixel 101, a superposed pixel 102 located at the right of the pixel 101, a superposed pixels 102 located at the upper right corner of the pixel 101 and a superposed pixels 102 located at the upward side of the intrinsic pixel 101 passes through the micro lenses 201 that correspond to the intrinsic pixels 101 and each of superposed pixels 102. Thus, the number of images of the display panel 10 on the central depth plane O-O' within one frame is further increased to achieve the purpose of further improving the resolution.

In some embodiments, in the case where the above described four stopping positions are set on a corresponding preset path of the at least one preset path, the above described S103, in which at the at least two stopping positions, the signal processor 42 provides display sub-images to the display panel 10 according to the at least one preset path and one frame of display image, includes: the signal processor 42 sequentially dividing one frame of display image into four display sub-images according to the order of the stopping positions on the corresponding preset path, and each display sub-image corresponding to one stopping position.

Based on this, after the display panel 10 and the micro lens array 20 are relatively displaced along the at least one preset path, the users' eyes are able to superpose the display sub-image displayed by intrinsic pixels 101 with the display sub-images respectively displayed by the superposed pixels 102 that are formed around the intrinsic pixels 101, thereby observing the above described one frame of display image.

On this basis, in order to facilitate displaying of the next frame of image, superposed pixels 102 are formed around each of the intrinsic pixels 101. In some embodiments, within the plane XOY, the downward movement of the intrinsic pixels 101 in the display panel 10 along the direction of the arrow in FIG. 3e is achieved through parallel relative displacement between the display panel 10 and the micro lens array 20. At this time, the intrinsic pixels 101 in the display panel 10 are returned to the above described first stopping position 1 (as shown in FIG. 3a). In this case, the starting point and the end point of the corresponding preset path overlap. In this way, when a next frame of image is displayed, the display panel 10 and/or the micro lens array 20 can start to move from a same starting position as a previous frame of image. Thereby, the setting manner of the at least one preset path may be simplified, so that the display image of the pixels 101 for determining the intrinsic resolution of the display panel 10 may be more easily allocated to the newly added superposed pixels 102 of the next frame.

As can be seen from the above description, in the process of relative displacement between the display panel 10 and the micro lens array 20, when the display panel 10 or the micro lens array 20 is located at a stopping position twice, for example, when the starting point and the end point of the preset path overlap, the relative positions of the display panel 10 and the micro lens array 20 do not change at the same stopping position, so no new superposed pixel 102 can be formed around the intrinsic pixels 101. Therefore, in order to improve the resolution of the display panel 10, any two stopping positions on the same preset path except the starting point and the end point are different.

Furthermore, in order to enable the images respectively displayed by the respective superposed pixels 102 to be uniformly overlaid, in some embodiments, the distances between two adjacent stopping positions are the same.

The above description is made by taking an example in which the spacing P between two adjacent intrinsic pixels 101 of the display panel 10 is sufficiently large, such that a newly added superposed pixel 102 is formed between two adjacent pixels 101 after the display panel 10 is moved. In this case, for the display panel 10 having a low intrinsic resolution, it is still possible to display an image with a higher resolution without increasing the number of intrinsic pixels 101 in the manufacturing process, thereby simplifying the manufacturing process and reducing the production cost.

Figure 11:
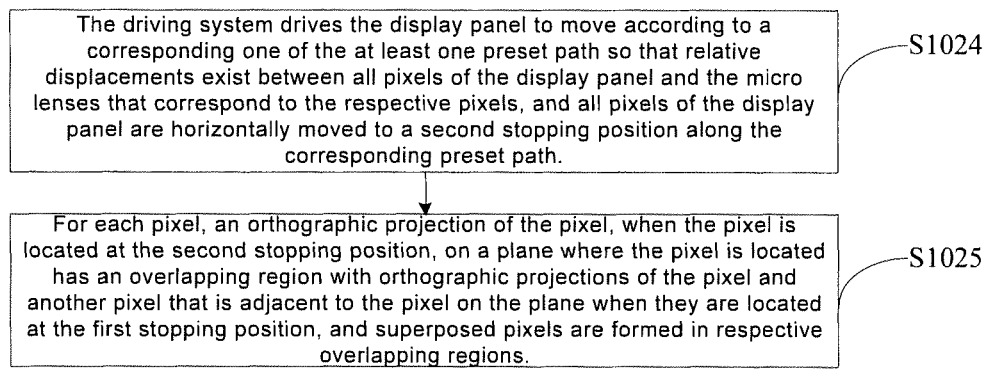
FIG. 11 is a flow diagram of another implementation manner of S102 according to some embodiments of the present disclosure.

In a case where the spacing between two adjacent intrinsic pixels 101 of the display panel 10 is small, in some embodiments, the spacing between two adjacent pixels 101 of the display panel 10 is less than a half of a width h of one pixel 101. The above described S102, in which the driving system 40 derives the display panel 10 and/or the micro lens array 20 to move along respective preset path(s) according to the at least one preset path so that all the pixels 101 of the display panel 10 are relatively displaced with respect to the micro lenses 201 that correspond to respective pixels 101, and controls the display panel 10 and/or the micro lens array 20 to stop displacing at corresponding stopping positions, as shown in FIG. 11, includes steps 1024 and 1025 (S1024 and S1025).

In S1024, the driving system 40 drives the display panel 10 to move according to a corresponding one of the at least one preset path so that relative displacements exist between all pixels 101 of the display panel 10 and the micro lenses 201 that correspond to the respective pixels 101, and all pixels 101 of the display panel 10 are horizontally moved to a second stopping position 2 along the corresponding preset path.

The first stopping position 1 is for example the initial position of the display panel 10.

As shown in FIG. 4a, intrinsic pixels 101 of the display panel 10 are taken as an example, and the pixels 101 horizontally move to the second stopping position 2 along the preset path from the first stopping position 1 (the dashed box in FIG. 4a).

In S1025, as shown in FIG. 4a, for each pixel 101, an orthographic projection of the pixel 101, when the pixel 101 is located at the second stopping position 2, on a plane where the pixel 101 is located has an overlapping region with orthographic projections of the pixel 101 and another pixel 101' that is adjacent to the pixel 101 on the plane when they are located at the first stopping position 1, and a superposed pixel 102_B and a superposed pixel 102_A' are formed in respective overlapping regions.

For each pixel 101, a superposed pixel 102_B is formed in the overlapping region between the orthographic projections of the pixel 101 when it is located at the second stopping position 2 and the pixel 101 (shown by solid line) when it is located at the initial position (the first stopping position 1) on the plane. For another pixel 101' (shown by the dashed box) adjacent to the pixel 101, a superposed pixel 102'_A is formed in the overlapping region between the orthographic projections of the pixel 101' when it is located in the first stopping position 1 and the pixel 101 when it is located at the second stopping position 2 on the plane.

Figure 12:
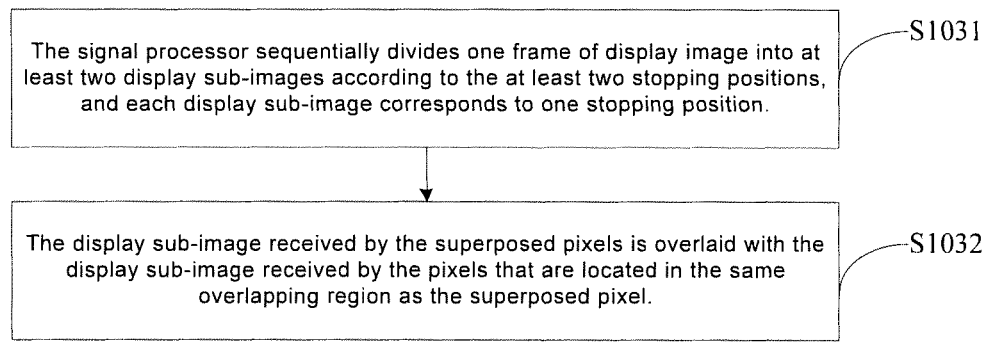
FIG. 12 is a flow diagram of an implementation manner of S103 according to some embodiments of the present disclosure.

In this case, the above described S103, in which at the least two stopping positions, the signal processor 42 provides display sub-images to the display panel 10 according to the at least one preset path and one frame of display image, as shown in FIG. 12, includes steps 1031 and 1032 (S1031 and S1032).

In S1031, the signal processor 42 sequentially divides one frame of display image into at least two display sub-images according to the at least two stopping positions (for example, the first stopping position 1 and the second stopping position 2), and each display sub-image corresponds to one stopping position.

In S1032, the display sub-image received by the superposed pixels 102 is overlaid with the display sub-image received by the pixels 101 that are located in the same overlapping region as the superposed pixel 102.

The superposed process of the above described display sub-images will be described below by taking the gray scale value as an example. For example, since the superposed pixel 102_B is formed by superposing orthographic projections of the pixel 101 when it is located at the second stopping position 2 and the initial position (the first stopping position 1) on the plane, the value of the gray scale displayed by the superposed pixel 102_B is the value obtained by superposing the value of the gray scale displayed by the intrinsic pixel 101 with the value of the gray scale displayed by the pixel 101 when it is moved to the second stopping position 2. It is assumed that the target value of the gray scale needed to be displayed by the superposed pixel 102_B is 80, and the value of the gray scale displayed by the intrinsic pixel 101 before moving (the first stopping position 1) is 60. In this case, the value of the gray scale displayed by the superposed pixel 102A is also 60. Then only when the pixel 101 moves to the second stopping position 2, and the value of the gray scale displayed by the pixel 101 that is located at the second stopping position 2 is 20, the superposed pixel 102_B located at the above described overlapping region displays a gray scale with a value of 80.

Furthermore, the superposed pixel 102'_A is formed by overlapping the orthographic projection of the pixel 101' on the plane when it is located at the first stopping position 1 with the orthographic projection of the pixel 101 on the plane when it is located at the second stopping position 2, such that the target value of the gray scale needed to be displayed by the superposed pixel 102'_A is a gray scale value after superposing the value of the gray scale displayed by the pixel 101' with the gray scale value of the pixels 101 when it is located at the second stopping position 2 by adjusting the value of the gray scale displayed by the pixel 101' before movement (the first stopping position 1). The adjustment process of the target value of the gray scale displayed by the rest superposed pixels is the same as described above, and it is unnecessary to go into details here.

Furthermore, as shown in FIG. 4b, when the third stopping position 3 and the fourth stopping position 4 are also disposed on the preset path, one pixel 101 can be divided into four superposed pixels 102. At this time, the formation process of the above described superposed pixels and the superposed display process of the display sub-images are the same as described above, and it is unnecessary to go into details here.

The embodiments in which the display panel 10 and/or the micro lens array 20 are relatively displaced along the at least one preset path are exemplified in detail below. On the premise that the display panel 10 and the micro lens array 20 are relatively displaced, the manners of movement are not limited, including but not limited to the following manners.

In some embodiments, as shown in FIG. 5, the micro lens array 20 is fixed and the display panel 10 is controlled to move along the preset path (shown by the arrow line) relative to the micro lens array 20.

Figure 7:
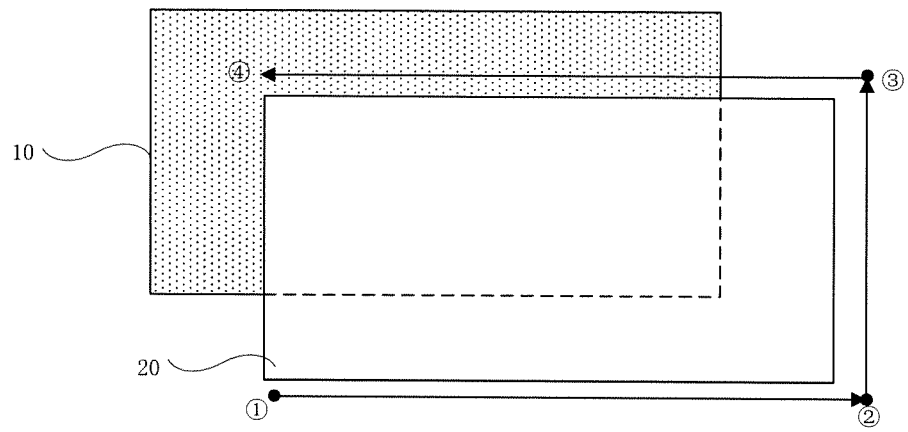
FIG. 7 is a schematic diagram of another preset path parallel to a light exit surface of a display panel according to some embodiments of the present disclosure.

In some other embodiments, as shown in FIG. 7, the display panel 10 is fixed and the micro lens array 20 is controlled to move along the preset path (shown by the arrow line) relative to the display panel 10.

Figure 8:
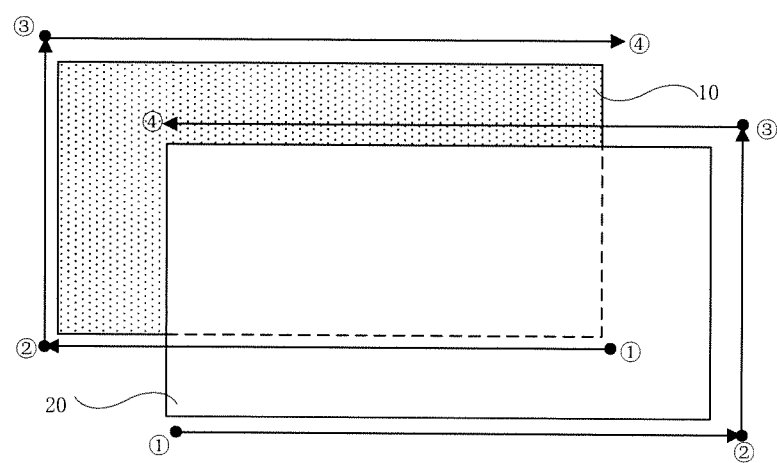
FIG. 8 is a schematic diagram of yet another preset path parallel to a light exit surface of a display panel according to some embodiments of the present disclosure.

In some other embodiments, as shown in FIG. 8, the display panel 10 and the micro lens array 20 are respectively controlled to move along respective preset paths (shown by the arrow lines in different directions). The moving directions of the display panel 10 and the micro lens array 20 are opposite.

In order to achieve the parallel relative displacement between the display panel 10 and the micro lens array 20, in some embodiments, the display panel 10 and the micro lens array 20 adopt different preset paths.

In some embodiments, as shown in FIG. 9, the at least one preset path includes a first preset path D1 and a second preset path D2. The first preset path D1 is different from the second preset path D2.

In this case, as shown in FIG. 9, in the above described S102, the display panel 10 is controlled to move along the first preset path D1, and the micro lens array 20 is controlled to move along the second preset path D2. In this case, in order to achieve the parallel relative displacement between the display panel 10 and the micro lens array 20, the plane where the first preset path D1 is located is parallel to the plane where the second preset path D2 is located.

For example, as shown in FIG. 9, both the plane where the first preset path D1 is located and the plane where the second preset path D2 is located are parallel to the light exit surface of the display panel 10 or the light exit side surface of the micro lens array 20.

Alternatively, both the plane where the first preset path D1 is located and the plane where the second preset path D2 is located intersect with the light exit surface of the display panel 10 or the light exit side surface of the micro lens array 20 in the same angle.

It will be noted that the superposed pixels 102 are generated around the intrinsic pixels 101 in the display panel 10, or the pixel 101 is divided into a plurality of superposed pixels 102 when the manner shown in FIG. 5, FIG. 7, FIG. 8 or FIG. 9 is adopted, and the manners and display principles thereof are the same as described above, which will not be elaborated here.

Other embodiments for relative displacement between the display panel 10 and the micro lenses 201 along the at least one preset path will not be elaborated in the present disclosure.

Figure 16:
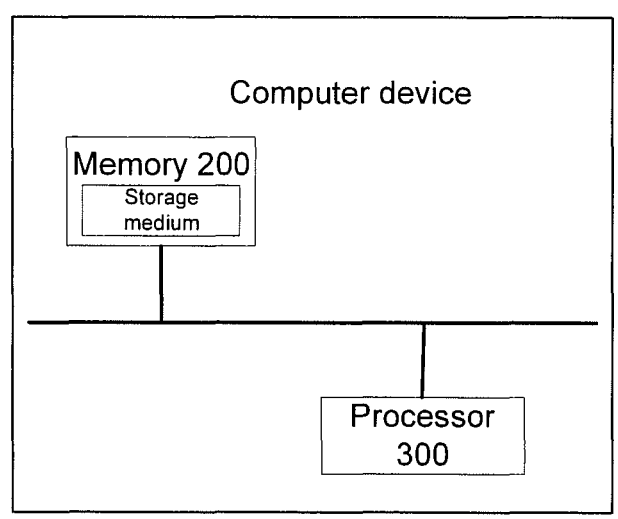
FIG. 16 is a schematic diagram of a computer device according to some embodiments of the present disclosure.

Some embodiments of the present disclosure provide a computer device, and as shown in FIG. 16, the computer device includes a memory 200 and a processor 300. The memory 200 includes executable instructions stored thereon, and the processor 300 is configured to execute the executable instructions to implement the display method of the display device as described above. The computer device has the same technical effect as the display method of the display device, and it is unnecessary to go into details here. The above memory may include various media that can store program codes, such as ROM, RAM, disk, and compact disc.

Some embodiments of the present disclosure provide a non-transitory computer readable storage medium. The medium stores executable instructions that, when executed by a display device, cause the display device to implement the display method of the display device as described above. The non-transitory computer readable storage medium has the same technical effect as the display method of the display device, and it is unnecessary to go into details here.

Some embodiments of the present disclosure provide a display device. The display device includes a display panel 10 and a micro lens array 20 disposed on a display side of the display panel 10. The micro lens array 20 includes a plurality of micro lenses 201 arranged in an array. Furthermore, the display device, as shown in FIG. 1b, further includes a driving system 40, a controller 41, and a signal processor 42.

In some embodiments, the display device further includes a front frame, while the driving system 40 includes at least one vibration platform.

Figure 13:
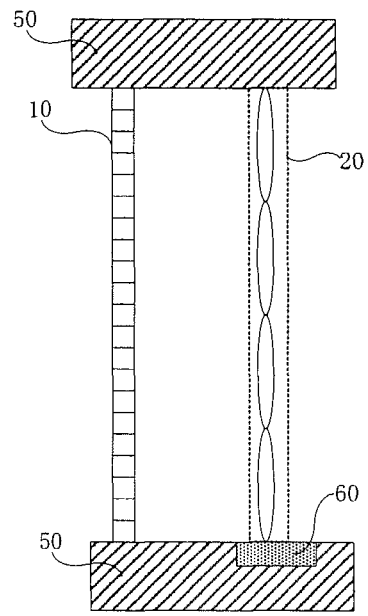
FIG. 13 is a schematic structural diagram of another display device according to some embodiments of the present disclosure.

In this case, in some embodiments, as shown in FIG. 13, the display panel 10 is fixedly mounted in the front frame 50. Furthermore, the micro lens array 20 is mounted on the vibration platform 60, and the vibration platform 60 is configured to drive the micro lens array 20 to move. For example, the vibration platform 60 has a holding device for fixing the micro lens array 20, and the vibration platform 60 is provided with a guide rail that matches the preset path, and the holding device is mounted in the guide rail. In addition, the vibration platform 60 further includes a driving unit connected to the holding device, for example, an electromotor or a hydraulic motor. Under the driving action of the motor, the holding device may be driven to motivate the micro lens array 20 to move along the guide rail, thereby achieving the purpose that the driving system drives the micro lens array 20 to move along the preset path.

Figure 14:
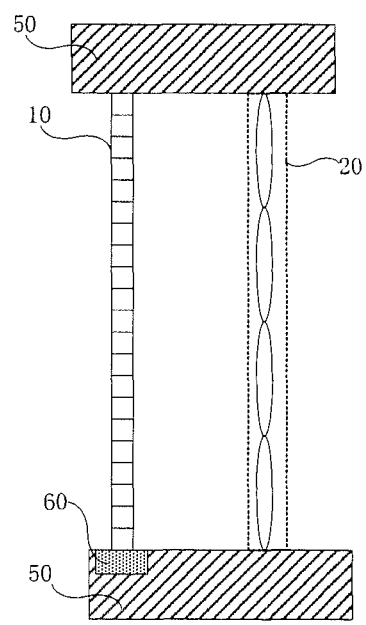
FIG. 14 is a schematic structural diagram of yet another display device according to some embodiments of the present disclosure.

In some other embodiments, as shown in FIG. 14, the micro lens array 20 is fixedly mounted in the front frame 50. The display panel 10 is mounted on the vibration platform 60, and the vibration platform 60 is configured to drive the display panel 10 to move. The setting manner of the vibration platform 60 is the same as the setting manner above, and it is unnecessary to go into details here.

Figure 15:
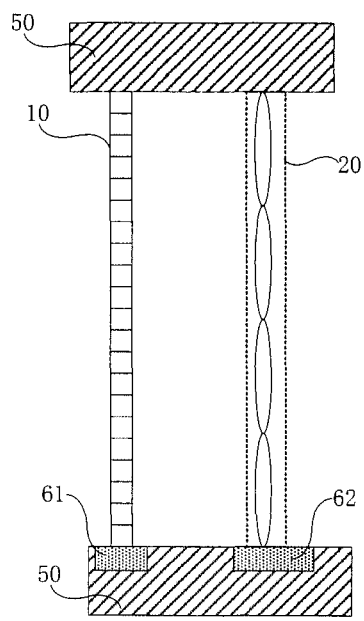
FIG. 15 is a schematic structural diagram of yet another display device according to some embodiments of the present disclosure.

Furthermore, in the case where both the display panel 10 and the micro lens array 20 can move, as shown in FIG. 15, the driving system 40 includes a first vibration platform 61 and a second vibration platform 62. In this case, the display panel 10 is mounted on the first vibration platform 61. The first vibration platform 61 is configured to drive the display panel 10 to move. The micro lens array 20 is mounted on the second vibration platform 62. The second vibration platform 62 is configured to drive the micro lens array 20 to move.

The setting manners of the first vibration platform 61 and the second vibration platform 62 are the same as the setting manner of the above vibration platform 60, and they are unnecessary to go into details here.

Furthermore, when the size of the display device is small, the requirement for the displacement precision of relative displacement between the display panel 10 and the micro lens array 20 is high. In this case, the driving system 40 is for example an MEMS system. The MEMS system has a vibration platform with, for example, a small size and a high movement precision.

The display device has the same technical effect as the above described display method of the display device, and it is unnecessary to go into details here.

The controller described in the above embodiments is executed, for example, by a microprocessor programmed to perform one or more of the operations and/or functions described herein. Alternatively, the controller is implemented in whole or in part by specially configured hardware (e.g., by one or more application-specific integrated circuits (ASIC(s))).

The foregoing descriptions are merely some embodiments of the present disclosure, but the protection scope of the present disclosure is not limited thereto. For those skilled in the art, various changes and modifications can be made therein without departing from the spirit and essence of the disclosure, which are also considered to be within the scope of the disclosure. Therefore, the protection scope of the present disclosure shall be determined by the protection scope of the claims.

What is claimed is:

1. A display device, comprising:
   a display panel;
   a micro lens array disposed on a display side of the display panel, the micro lens array comprising a plurality of micro lenses arranged in an array;
   a controller configured to set at least one preset path within one frame, each preset path having at least two stopping positions thereon;
   a driving system connected to the controller, and the display panel and/or the micro lens array, wherein the driving system is configured to drive, according to the at least one preset path, the display panel and/or the micro lens array to move along respective preset path(s), and to control the display panel and/or the micro lens array that move along the respective preset path(s) to stop moving and maintain a stopping state within a preset time duration at corresponding stopping positions; and
   a signal processor connected to the controller and the display panel,
   wherein the signal processor is configured to, in response to stopping of the display panel and/or the micro lens array at the corresponding stopping positions, provide display sub-images to the display panel according to the at least one preset path and one frame of display image, and make the display panel to display a display sub-image when the display panel is at each of the at least two stopping positions within one frame, and
   wherein the display sub-image is displayed by intrinsic pixels of the display panel when the display panel is at each of the at least two stopping positions, and all the display sub-images that correspond to the at least two stopping positions in one of the at least one preset path are overlaid as the frame of display image.

2. The display device according to claim 1, further comprising a front frame, wherein the driving system comprises at least one vibration platform;
   the display panel is fixedly mounted in the front frame, the micro lens array is mounted on the vibration platform, and the vibration platform is configured to drive the micro lens array to move; or the micro lens array is fixedly mounted in the front frame, the display panel is mounted on the vibration platform, and the vibration platform is configured to drive the display panel to move.

3. The display device according to claim 1, wherein the driving system comprises a first vibration platform and a second vibration platform;
the display panel is mounted on the first vibration platform, and the first vibration platform is configured to drive the display panel to move;
the micro lens array is mounted on the second vibration platform, and the second vibration platform is configured to drive the micro lens array to move.

4. The display device according to claim 1, wherein the driving system is a micro-electro-mechanical system.

5. A display method of the display device according to claim 1, comprising:
setting, by the controller, at least one preset path within one frame, each preset path having at least two stopping positions thereon;
within one frame, driving, by the driving system, the display panel and/or the micro lens array to move along respective preset path(s) according to the at least one preset path, so that all pixels of the display panel are displaced with respect to micro lenses that correspond to respective pixels, and controlling, by the driving system, the display panel and/or the micro lens array to stop displacing and maintain a stopping state within a preset time duration at corresponding stopping positions, wherein the display panel does not display during that all pixels of the display panel are relatively displaced with respect to the micro lenses that correspond to the respective pixels;
at the at least two stopping positions, providing, by the signal processor, display sub-images to the display panel according to the at least one preset path and one frame of display image, and make the display panel to display a display sub-image when the display panel is at each of the at least two stopping positions within one frame, wherein the display sub-image is displayed by intrinsic pixels of the display panel when the display panel is at each of the at least two stopping positions, and the pixels in the display panel emitting light according to display image sub-signals; and
converging, by each micro lens, light emitted by pixels that correspond to the micro lens so that images are formed on a side of the micro lens away from the display panel.

6. The display method of the display device according to claim 5, wherein,
a plane where each of the at least one preset path set by the controller is located is parallel to a light exit surface of the display panel or a light exit side surface of the micro lens array.

7. The display method of the display device according to claim 6, wherein one of the at least one preset path comprises four stopping positions, and a starting point of the one of the at least one preset path is a first stopping position; in the display panel, a spacing between any two adjacent pixels is greater than or equal to a width of a pixel;
driving, by the driving system, the display panel and/or the micro lens array to move along respective preset path(s) according to the at least one preset path, so that all pixels of the display panel are displaced with respect to micro lenses that correspond to respective pixels, and controlling, by the driving system, the display panel and/or the micro lens array to stop displacing at corresponding stopping positions, comprises:
driving, by the driving system, the display panel to move according to the one of the at least one preset path, so that relative displacements exist between all pixels of the display panel and the micro lenses that correspond to the respective pixels, all pixels of the display panel are horizontally moved to a second stopping position along the one of the at least one preset path, and in a horizontal direction, a superposed pixel that is located at the second stopping position is formed between any two adjacent pixels;
driving, by the driving system, the display panel to move according to the one of the at least one preset path, so that relative displacements exist between all pixels of the display panel and the micro lenses that correspond to the respective pixels, all pixels of the display panel are vertically moved to a third stopping position along the one of the at least one preset path, and in a vertical direction, a superposed pixel that is located at the third stopping position and is adjacent to the superposed pixel located at the second stopping position is formed; and
driving, by the driving system, the display panel to move according to the one of the at least one preset path, so that relative displacements exist between all pixels of the display panel and the micro lenses that correspond to the respective pixels, all pixels of the display panel are horizontally moved to a fourth stopping position along the one of the at least one preset path, and in the vertical direction, a superposed pixel that is located at the fourth stopping position and is adjacent to a pixel located at the first stopping position are formed.

8. The display method of the display device according to claim 7, wherein at the at least two stopping positions, providing, by the signal processor, display sub-images to the display panel according to the at least one preset path and one frame of display image, comprises:
sequentially dividing, by the signal processor, one frame of display image into four display sub-images according to an order of the four stopping positions on the one of the at least one preset path, and each display sub-image corresponding to one stopping position.

9. The display method of the display device according to claim 6, wherein one of the preset path comprises at least two stopping positions, and a starting point of the one of the at least one preset path is a first stopping position; in the display panel, a spacing between any two adjacent pixels is less than a half of a width of a pixel;
driving, by the driving system, the display panel and/or the micro lens array to move along respective preset path(s) according to the at least one preset path, so that all pixels of the display panel are displaced with respect to micro lenses that correspond to respective pixels, and controlling, by the driving system, the display panel and/or the micro lens array to stop displacing at corresponding stopping positions, comprises:
driving, by the driving system, the display panel to move according to the one of the at least one preset path, so that relative displacements exist between all pixels of the display panel and the micro lenses that correspond to the respective pixels, and all pixels of the display panel are horizontally moved to a second stopping position along the one of the at least one preset path, and wherein
for each pixel, an orthographic projection of the pixel when it is located at the second stopping position on a plane where the pixel is located has an overlapping region with an orthographic projection of the pixel when it is located at the first stopping position on the plane, and has an overlapping region with an orthographic projection of another pixel adjacent to the pixel on the plane when the another pixel is located at the first stopping position, and superposed pixels are respectively formed at the overlapping regions.

10. The display method of the display device according to claim 9, wherein at the at least two stopping positions, providing, by the signal processor, display sub-images to the display panel according to the at least one preset path and one frame of display image, comprises:
sequentially dividing, by the signal processor, the one frame of display image into at least two display sub-images according to the at least two stopping positions, and each display sub-images corresponding to one stopping position; and
superposing, by the signal processor, a display sub-image received by the superposed pixels with a display sub-image received by the pixels each of which is in a same overlapping region as a corresponding one of the superposed pixels.

11. The display method of the display device according to claim 5, wherein a starting point and an end point of each preset path overlap.

12. The display method of the display device according to claim 5, wherein any two stopping positions on each preset path except a starting point and an end point are different.

13. The display method of the display device according to claim 5, wherein a distance between a stopping position and an adjacent stopping position on a same preset path of the at least one preset path has a same value as a distance between the stopping position and another adjacent stopping position one the same preset path.

14. A computer device, comprising:
a memory comprising executable instructions stored thereon; and
a processor configured to execute the executable instructions to implement the display method of the display device according to claim 5.

15. A non-transitory computer-readable storage medium storing executable instructions that, when executed by a display device, cause the display device to implement the display method of the display device according to claim 5.

* * * * *